(12) United States Patent
Horino et al.

(10) Patent No.: US 6,378,389 B1
(45) Date of Patent: Apr. 30, 2002

(54) TOGGLE-STYLE OVERLOAD PROTECTION DEVICE

(75) Inventors: Atsuhito Horino; Seiichi Yokoyama, both of Kanagawa (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/555,677
(22) PCT Filed: Dec. 11, 1998
(86) PCT No.: PCT/US98/26316
 § 371 Date: Jun. 2, 2000
 § 102(e) Date: Jun. 2, 2000
(87) PCT Pub. No.: WO99/31770
 PCT Pub. Date: Jun. 24, 1999

(30) Foreign Application Priority Data

Dec. 12, 1997 (JP) .............................................. 9-362851

(51) Int. Cl.⁷ ............................................... F16H 21/26
(52) U.S. Cl. .......................................... 74/38; 439/157
(58) Field of Search ......................... 74/38, 2; 439/157, 439/255

(56) References Cited

U.S. PATENT DOCUMENTS 4,193,187 A * 3/1980 Haller et al. .................. 29/749

* cited by examiner

Primary Examiner—David Fenstermacher
(74) Attorney, Agent, or Firm—Charles S. Cohen; Thomas D. Paulius

(57) ABSTRACT

An anti-overloading device for use in a restraint-camming apparatus in which the apparatus includes a linear guide for guiding an associated operating member in reciprocating movement and a restraint cam for reciprocating the operating member in its movement has a toggle assembly that which is fixed to the operating member. The toggle assembly comprises a "U"-shaped body, two support links that are rotatably connected to the free ends of opposite free ends of the toggle assembly body portion that engages the ends of the links, and a cam follower rotatably supported by the pin. The cam follower is engaged with the restraint cam to thereby put the restraint cam in a controlled restraint position between the cam follower and a counterpart cam follower roll that is fixed to the operating member. The toggle assembly permits the anti-loading structure can be reduced in size, still permitting the setting of an increased permissible load.

16 Claims, 6 Drawing Sheets

TOGGLE-STYLE OVERLOAD PROTECTION DEVICE

BACKGROUND OF THE INVENTION

The present invention relates to overload protection devices and assemblies that are used in restraint-camming apparatus for driving associated operating members in reciprocating movement, and more particularly, to an overload protection device for use in a restraint camming apparatus that operates operating members, such as terminal stitching heads that are commonly used in to insert conductive terminals in electrical connector housings.

Anti-overloading devices are used in restraint-camming apparatus for translating operating members in order to prevent apparatus, such as terminal insertion devices from exerting too much pressure or insertion force on a terminal. In terminal insertion devices where conductive terminals are inserted, or "stitched" into corresponding openings arranged in insulative connector housings, the stitching head is operated in a reciprocating motion in two different directions, typically by a camming assembly. Sometimes, the openings in the conductor housing may be made misaligned and the terminals, when stitched, will impinge upon the connector housing rather than enter into the terminal openings.

When this occurs, it is desirable to have some measure of control and protection that prevents the stitching head from continuing its insertion movement when a strong resistance force exceeding a certain magnitude is encountered. This protection preferably prevents the stitching head from continuing in its insertion movement when a force greater than a preselected insertion force is encountered. If the stitching head continues in its movement against a preselected resistance force, the stitching head may break. Thus the need for this type of protection exists.

FIG. 8 of this application illustrates a known overload protection assembly used with a restraint camming apparatus. It can be seen that the conventional apparatus includes a first operating member 53 that is guided by a main linear guide 52 for reciprocating movement in two opposing directions. A secondary linear guide 51 is located between the first operating member 53 and a second operating member 54 such that the second operating member 54 is guided by the linear sub-guide 51. A restraint cam 55 of the apparatus that drives the first operating member 53 in its reciprocating movement is bounded by two cam followers 56 that are rotatably mounted to the first operating member 53. The second operating member 54 is able to resist a given load exerted thereon in the direction of the arrow in FIG. 8 by way of an associated compression spring 57. Rotation of the restraint cam 55 about its axle 58 causes the first operating member 53 to move back and forth in reciprocating movement along the main linear guide 52, and carrying the second operating member 54.

Another known anti-overloading protection device is illustrated in FIG. 9, wherein a first operating member 63 is guided by an associated main linear guide 62. A sub-linear guide 61 is disposed between the first operating member 63 and a second operating member 64 so that the second operating member 64 may be guided by the sub-linear guide 61. A restraint cam 65 is bounded by two cam followers 66 rotatably mounted to the first and second operating members 63, 64. The second operating member 64 is pushed against the first operating member 63 by a compression spring 67 that exerts a force on the second operating member 64 and two associated blocks 68. Rotation of the restraint cam 65 about its axle 69 will cause the first operating member 63 to move back and forth along the main linear guide.

Use of either of the aforementioned sub-linear guides 51, 61 to apply a force on their respective first operating numbers 53, 63 increases the both size and weight of the anti-overloading devices, thus reducing the quickness with which the anti-overloading device can respond to a given action at increased speed. The known anti-overloading device of FIG. 8 is so constructed that it may be subjected directly to the load, preventing the device from being released from the overload. Therefore, increasing the strength of the opposing compression spring 57 will cause an adverse effect on the protecting capability provided by the device.

As for the apparatus illustrated in FIG. 9, a counter-moment, such as that shown by the arrow 70 will apparently cause one or the other cam follower 66 to abut the cam 65 in an unstable manner, thereby upsetting its equilibrium. Alternatively, a shear pin may be used to make the device resistant to an increased load amount, but the use of such a shear pin does not provide the capability to restore the apparatus and has a poor reproduction. Accordingly, it cannot have a good reliability in setting a required amount of permissible load.

SUMMARY OF INVENTION

One object of the present invention is therefore to provide an improved anti-overloading device for use in a restraint-camming apparatus for translating an associated operating member, which anti-overloading device is small enough in size so that it permits the device to be set for an increased amount of permissible load.

Another object of the present invention is to provide an anti-overloading device for use in a restraint camming apparatus that drives an operating member, such as a conductive terminal insertion head, in a reciprocating motion in two different and opposing directions, the overload protection device including a collapsible toggle assembly in the form of a cam follower interposed between the restraint cam and its associated operating member, the cam follower being movable between first and second operative positions, where in the first operative position, the cam follower is urged into contact with the restraint cam and transmits drive to the operating member and where in the second operative position, the cam follower collapses upon itself and moves out of contact with the restraint cam, thereby ending the transmission of drive to the operating member.

To attain this and other objects, an anti-overloading device according to the present invention uses a collapsible toggle assembly having a cam follower rotatably mounted for engaging the restraint cam and serving as a means for selectively transmitting drive from the restraint cam to its associated operating member.

Specifically, an anti-overloading device constructed in accordance with the principles of the present invention suitable for use in a restraint-camming apparatus having both a linear guide for guiding an associated operating member in a reciprocating movement and a restraint cam for moving the operating member in the reciprocating movement, is improved in that it includes a collapsible toggle assembly for mounting to the operating member, the toggle assembly having a "U"-shaped elongated body with two free arms, two linkages rotatably connected to the free ends of the opposite arms and on opposite sides thereon, a pin threading together the two linkages and rotatably supporting a cam follower that is engaged with the restraint cam, thereby putting the restraint cam in a controlled restraint condition between the cam follower and a second, guiding cam follower that is fixed to the operating member.

An anti-overloading device according to the present invention uses no sub-linear guides, and accordingly the size and weight of the device can be beneficially reduced. The toggle used in the anti-overloading device permits the associated parts of the device to move a relatively short distance for an increased amount of load.

Other objects and advantages of the present invention will be understood from the following description of anti-overloading devices according to preferred embodiments of the present invention, which are shown in accompanying drawings.

BRIEF DESCRIPTION OF THE DRAWINGS

In the course of the following detailed description reference will be made to the attached drawing wherein like reference numerals identify like parts and wherein.

DESCRIPTION OF PREFERRED EMBODIMENTS

Figure 1:
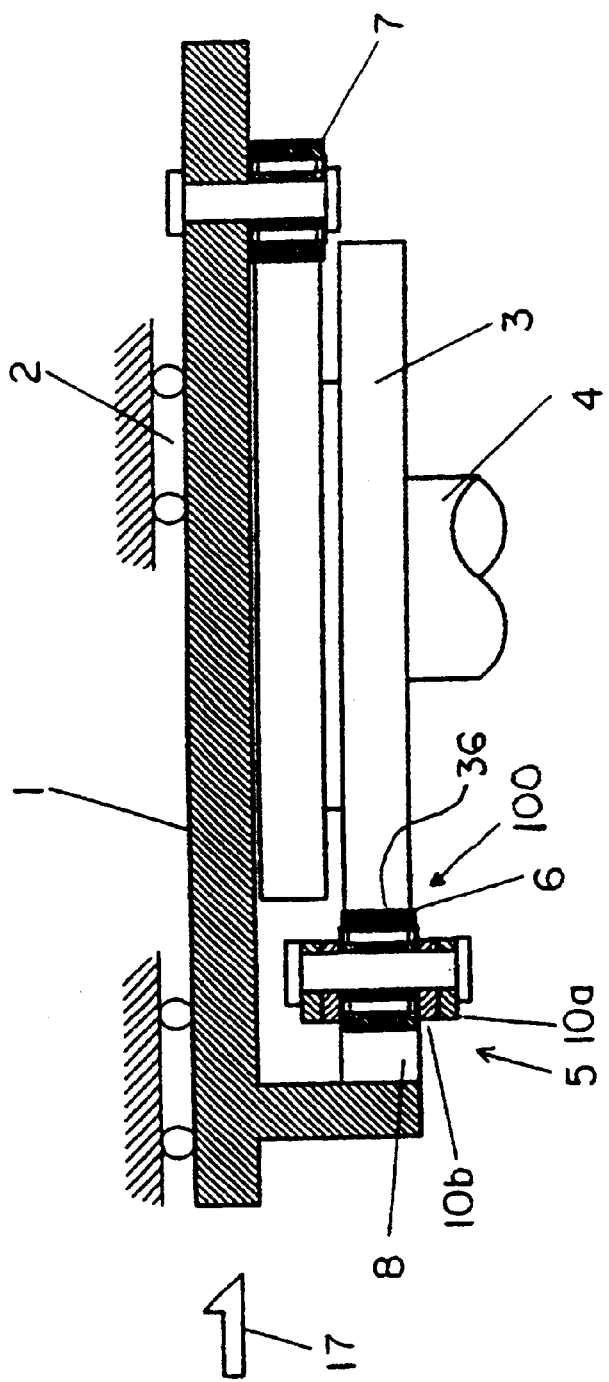
FIG. 1 is a top plan view of an anti-overloading device constructed in accordance with the principles of the present invention.

Referring to FIG. 1, an anti-overloading device for use in a restraint-camming apparatus is illustrated generally at 100. This anti-overloading device 100 includes a linear guide 2 for guiding an associated operating member 1 in reciprocating movement and a restraint cam 3 for reciprocating the operating member 1 in its reciprocating movement in two different and opposing directions when the restraint cam 2 is rotated about its axle 4.

Figure 2:
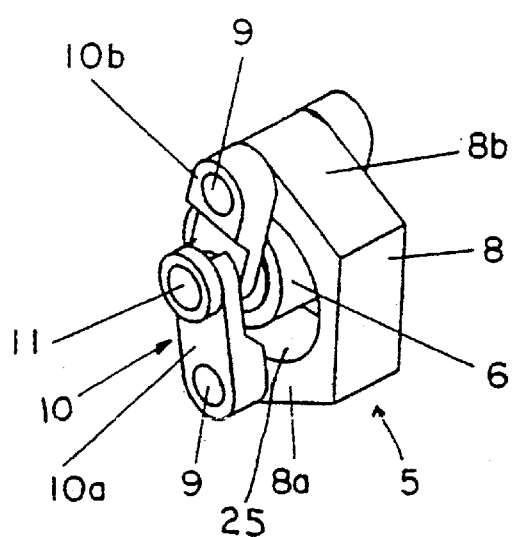
FIG. 2 is a perspective view of a toggle assembly used in the anti-overloading device.

As seen from FIGS. 1 & 2, the collapsible toggle assembly 5 includes a cam follower 6, and the toggle assembly 5 is mounted to one end of the operating member 1, and preferably to a surface thereof that opposes the working surface 102 of the restraint cam 3. The restraint cam 3 and the operating member 1 are put in a restraint position as shown in FIG. 1, by the cam follower 6 and a guiding cam follower 7 that is rotatably mounted to the other side of the operating member 1. In this position, the cam follower 6 of the toggle assembly 5 is maintained in contact with the restraint cam 3.

Figure 3:
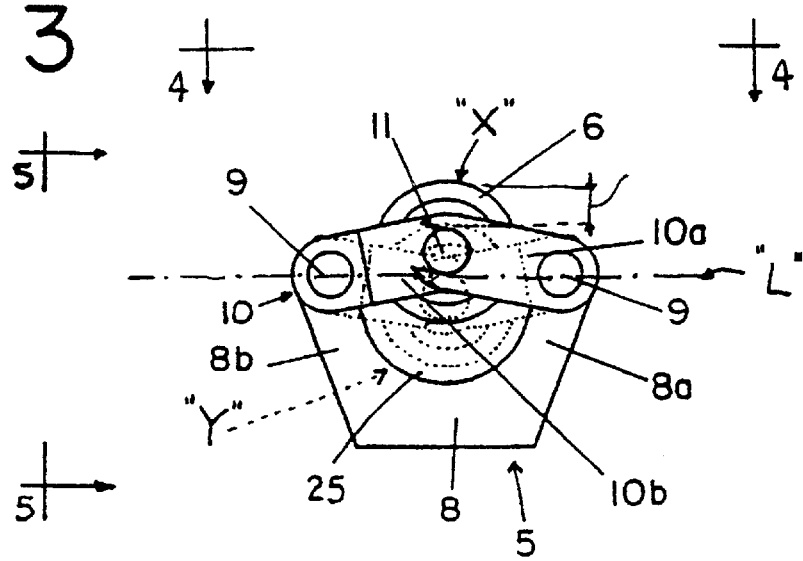
FIG. 3 is a side elevational view of the toggle assembly of FIG. 2.

Referring now to FIGS. 2 to 5, the collapsible toggle assembly 5 constructed in accordance with the principles of the present invention can be seen to include a "U"-shaped body, or base portion 8, having two free arms 8a and 8b, two linkages 10, each having first and second links 10a and 10b, that are rotatably connected to the free ends of the opposite arms 8a and 8b by pins 9, a pin 11 that engages the ends of the opposite arms 8a and 8b that cross each other as at "R" in FIG. 3, and a cam follower 6 rotatably supported by the pin 11.

Figure 4:
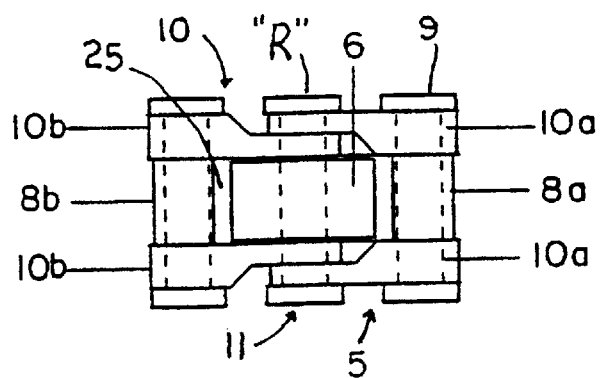
FIG. 4 is a top plan view of the toggle assembly of FIG. 3, taken along lines 4—4 of FIG. 3.
Figure 5:
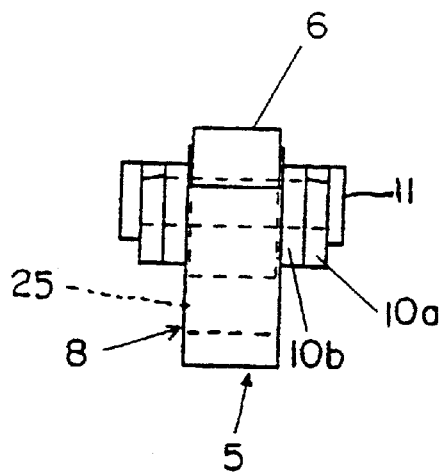
FIG. 5 is a side view of the toggle assembly of FIG. 3, taken along lines 5—5 of FIG. 3.
Figure 7:
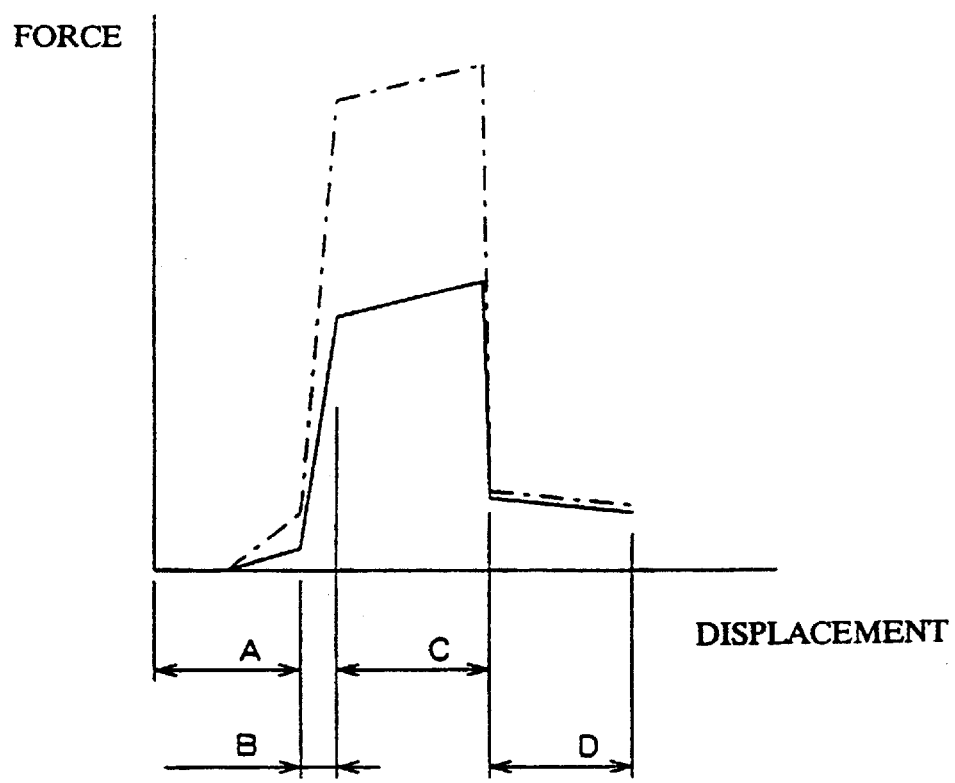
FIG. 7 is a force-displacement graph illustrating how the displacement of the toggle assembly cam follower varies with the load imposed thereon by the restraint cam.
Figure 8:
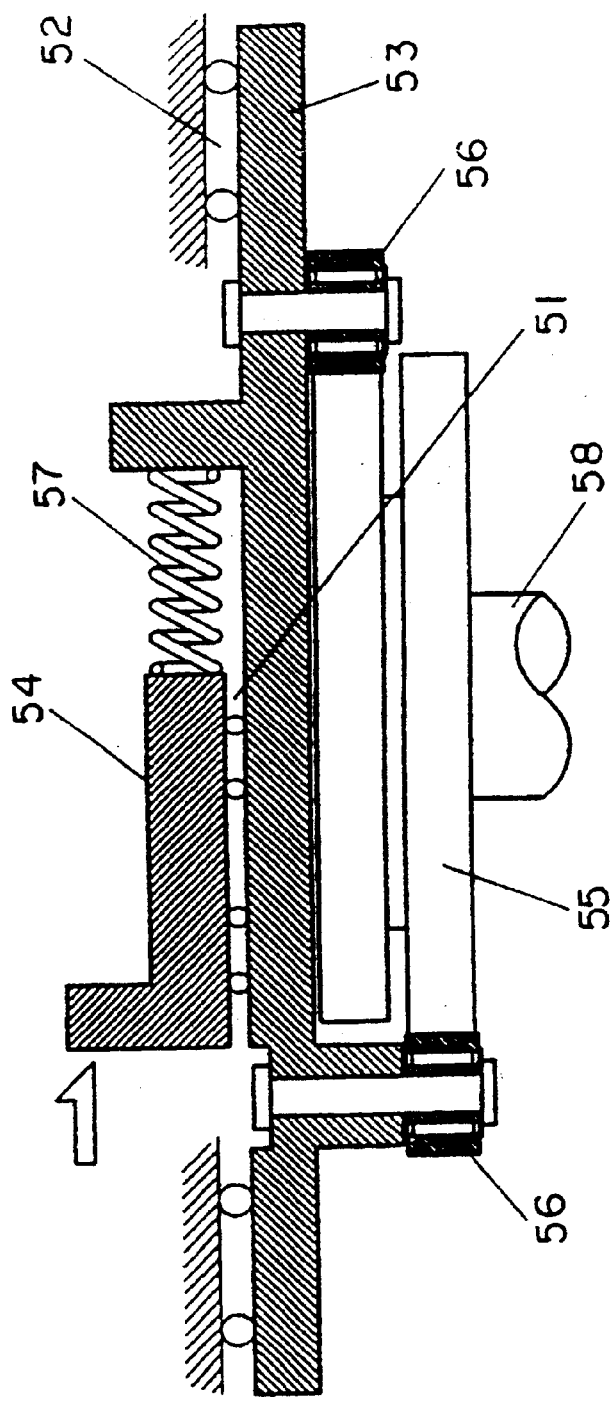
FIG. 8 is a plan view of a known anti-overloading protection device.
Figure 9:
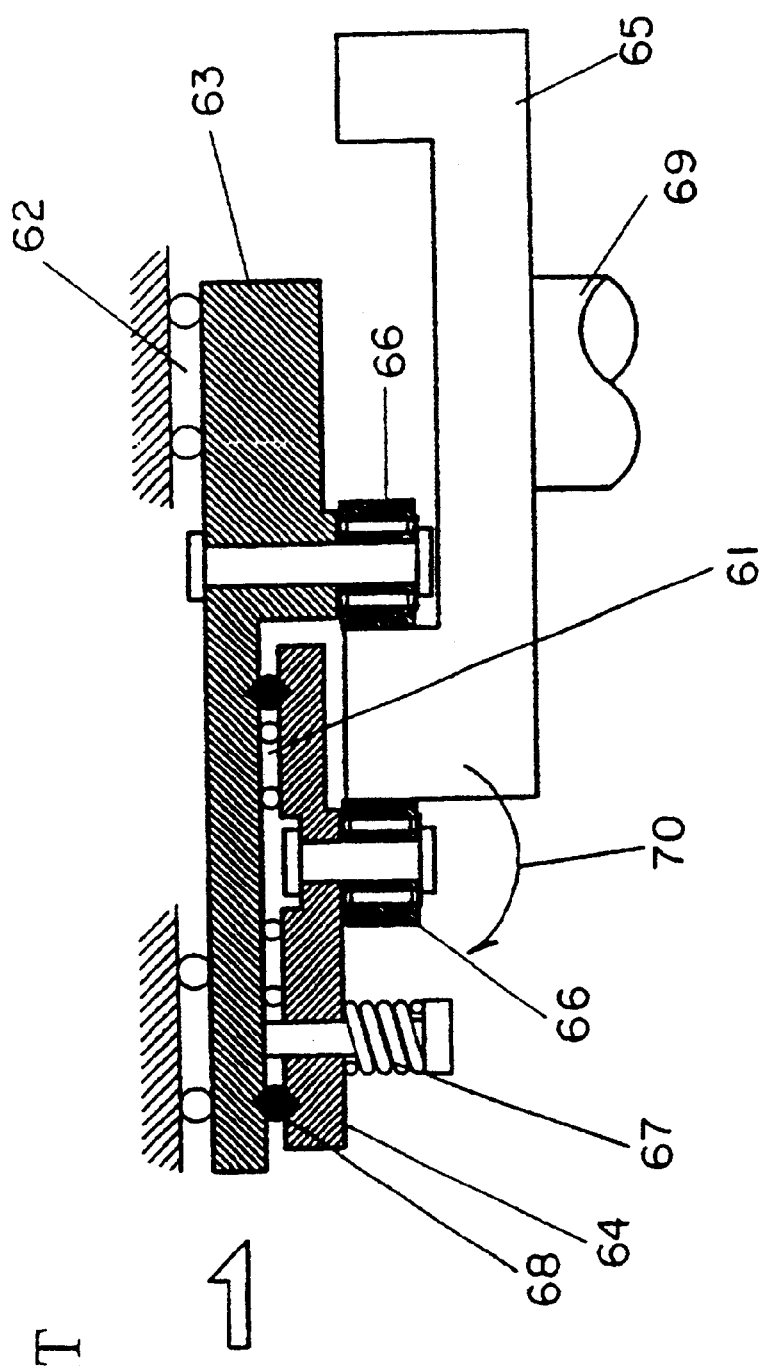
FIG. 9 is a plan view of another conventional anti-overloading protection device.

As seen in FIG. 7, the two linkages 10 support the cam follower 6 within an intervening space 25 that occurs between and separates the two free arms 8a, 8b of the toggle assembly body portion 8. The linkages 10 of the toggle assembly 5 extend on opposite sides of this space 25 as seen in FIG. 4 and serve to support the cam follower 6 therein. The two links 10a, 10b of the linkages 10 are pinned at their opposite ends to the free arms 8a, 8b. An imaginary line drawn through the centers of these two pins 9 defines a line "L" that defines the entrance of the intervening space 25 and which is useful in understanding the operation of the toggle assembly 5. The cam follower 6 will take one of two operative positions on either side of this line L.

Figure 6:
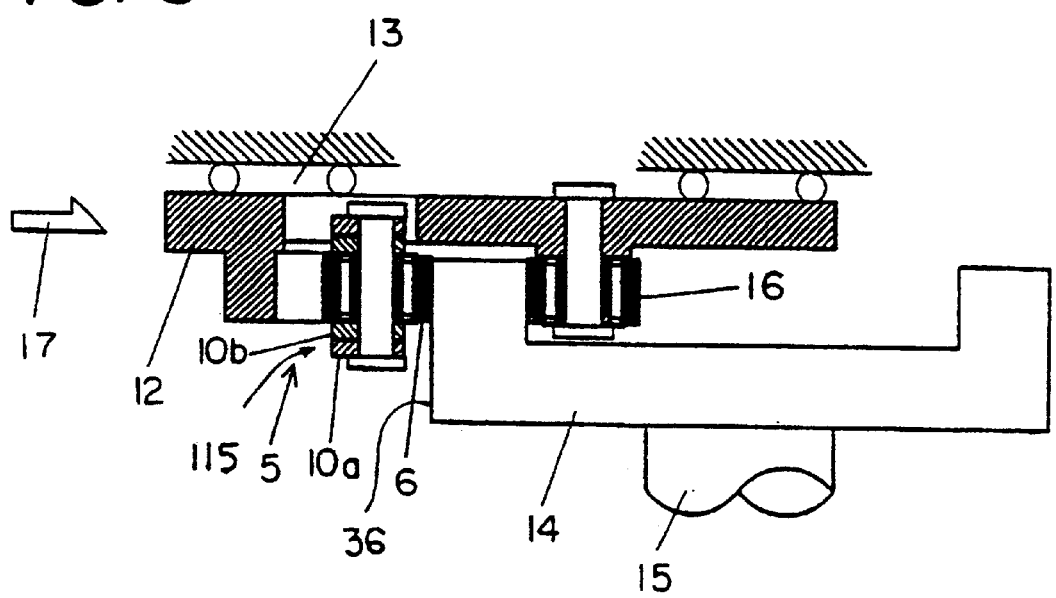
FIG. 6 is a plan view of a second embodiment of an anti-overloading device constructed in accordance with the principles of the present invention.

FIG. 3 illustrates the first of these two operative positions of the toggle assembly 5 where the linkages 10 maintain the cam follower 6 above, or on the outside of, the entrance line L to maintain the cam follower 6 in contact with the restraint cam 3, 14 as shown in FIG. 1 or 6. When a resistance force greater than a preselected value is encountered by the operating member 1, and the cam 3 keeps turning and applying force to the operating member 1, the cam follower 6 will "collapse" under this excessive force and the linkages 10 will move inward of the entrance line L, to adopt the position shown in phantom in FIG. 3, where the cam follower 6 is positioned inward of, or beneath, the entrance line L.

Referring now to FIG. 6, a second embodiment of an anti-overloading device according to the present invention is designated generally at 115. This device 115 includes a linear guide 13 for guiding an associated operating member 12 in reciprocating movement and a restraint cam 14 for reciprocating the operating member 12 when the restraint cam 14 is rotated around its axle 15. As in the case with the first embodiment, a collapsible toggle assembly 5 is provided with a cam follower 6, and is fixed to one end of the operating member 12. Thus, the cam 14 and the operating member 12 are put in the restraint position shown in FIG. 6 both by the cam follower 6 and a stationary guiding cam follower 16 that is rotatably fixed to the other end of the operating member 12.

In operation, the operating member 3 or 14 is driven in its reciprocating movement by rotation of the restraint cams 3, 14, so that the operating member 3 or 14 will then become loaded as indicated by arrow 17 when a device it drives, such as a connector terminal stitching head, contacts an object such as a connector housing. This resistance load, or force, due to insertion terminals is transmitted to the restraint cams 3 , 14 by way of the cam follower 6 of the toggle assembly 5. Thus, the "V"-shaped ridge formed by the two links 10a and 10b of the toggle assembly linkage 10 will collapse from its position of FIG. 3, thereby causing the cam follower 6 of the toggle assembly 5 to displace inward of the body portion 8, or to the position "Y" shown in phantom in FIG. 3.

FIG. 7 illustrates how the cam follower 6 of the toggle 5 is displaced with the increase of the load. The displacement range "A" shows a relatively large displacement range within which the cam follower 6 is displaced to reduce some gaps that may occur between the cam follower 6 and the outer cam surface 36 of the restraint cam 3, 14 at the outset of the operating member movement cycle. Irregular displacement of the cam follower 6 relative to possible changes in load can be reduced to minimum by applying to the toggle assembly 5 beforehand a force whose magnitude corresponds to a load large enough to cause displacement beyond the displacement range "A", thereby permitting the quick transition to the displacement range "B". Thus, the change in displacement of the cam follower 6 caused by the change in load can be reduced to minimum, thereby permitting the restraint cam 3 or 14 to be kept in the restraint position all the time, and hence the operating member 1 or 12 to be maintained in our position.

As seen from the displacement range "B", a relatively large permissible load range can be retained. When the toggle assembly 5 is loaded with a load large enough for the cam follower 6 to transfer to the displacement range "C", the cam follower is displaced at an increased distance, and thereby releasing the cam 3 or 14 from its restraint position where it is maintained in contact against the cam follower (and hence the operating member) to provide protection against the overloading. After removing the cause for overloading, the anti-overloading device can be restored to the initial restraint position by moving the cam follower 6 outside of the entrance line L to the body portion 8, i.e., back to the first operative position illustrated in FIG. 3, with the aid of an appropriate tool.

As seen from the phantom lines in FIG. 7, the length and/or width of the first and second links 10a, 10b of the linkages 10 and the length and/or width of each of the two arms 8a, 8b of the toggle 5 can be determined so that the load-to-displacement relationship may be changed to expand the permissible load range, i.e. the load range in which displacement may be within the displacement range "B", where contact is maintained between the restraint cam 3, 14 and the cam follower 6, as desired. Thus, the permissible load can be set appropriately for the purpose for which the restraint-camming device is used, and the use of the collapsible toggle assembly 5 permits the setting of a relatively large permissible load.

As may be understood from the above, the anti-overloading structure according to the present invention eliminates the need for sub-linear guides, thereby permitting the size and weight of the entire structure to be reduced accordingly, and the manufacturing cost can be reduced, too. Advantageously, the anti-overloading device can work quickly the instant that the operating member is overloaded. Thanks to the toggle assembly 5 used in the anti-overloading structure a relatively large permissible load can be set, and a permissible load range can be set simply by determining the sizes of arms 8a, 8b and links 10a, 10b appropriately for the purpose.

The toggle structure has opposite links 10a and 10b symmetrically fixed to its "U"-shaped body 8, and therefore, no moment appears when it is loaded, thus preventing the roll follower 6 from being put in a non-equilibrium loading condition.

While the preferred embodiments of the invention have been shown and described, it will be apparent to those skilled in the art that changes and modifications may be made therein without departing from the spirit of the invention, the scope of which is defined by the appended claims.

What is claimed is:

1. An anti-overloading device for use with an associated camming apparatus for driving an operating member in reciprocating motion in two opposing directions, the apparatus further including a linear guide assembly that guides the associated operating member in the reciprocating movement, and a rotatable cam for driving said operating member in said reciprocating movement during rotation of said cam, and further including a cam follower rotatably mounted to said operating member and positioned thereon so as to provide contact between said cam and said operating member, comprising:

a collapsible toggle assembly for supporting the cam follower in contact between said cam and said operating member during operation of said restraint camming apparatus, the collapsible toggle assembly collapsing to break said contact between said cam and said cam follower to thereby stop motion by said operating member in one of said two directions, when said operating member encounters a resistance force exceeding a preselected magnitude during movement in said one direction.

2. The anti-overloading device as set forth in claim 1, wherein said collapsible toggle assembly includes a base portion having two free ends extending therefrom and toward said cam, said two free ends being separated by an intervening space, two linkages rotatably connected to said toggle assembly free ends and disposed on opposite sides of said base portion and further spanning said base portion intervening space, said linkages further rotatably supporting said cam follower therebetween, said cam follower being movable between first and second operative positions, wherein in said first operative position said cam follower is in contact with said cam during said operating member reciprocating movement, and wherein when said operating member encounters a resistance force exceeding a preselected magnitude in its movement in said one direction, said linkages collapse into said base portion intervening space and thereby remove said cam follower from contact with said cam.

3. The anti-overloading device as set forth in claim 2, wherein each of said linkages has two opposing ends and a centerpoint, said linkage opposing ends being rotatably mounted to said toggle assembly base portion free ends and said cam follower being rotatably supported between said two linkages by a pin extending longitudinally through said base portion intervening space, said pin being aligned with said centerpoints of said linkages.

4. The anti-overloading device as set forth in claim 3, wherein in said first-operative position, said cam follower is positioned on one side of an imaginary line drawn across an entrance of said base portion intervening space, said one said being outside of said base portion intervening space, and wherein in said second operation position, said cam follower is positioned on an inner side of said imaginary line.

5. The anti-overloading device as set forth in claim 2, wherein each of said linkages includes first and second links, each of the first and second links having first ends that are rotatably connected to said base portion free ends, each of said first and second links further having second ends overlapping each other at a location intermediate said first ends thereof and intermediate said base portion free ends.

6. The anti-overloading device as set forth in claim 5, further including a pin rotatably supporting said cam follower and extending between said first and second link second ends.

7. The anti-overloading device as set forth in claim 5, wherein said cam follower is mounted on a pin and said first link second ends each include a hole that receives said cam follower pin and said second link second ends each include a slot that receives said pin cam follower.

8. The anti-overloading device as set forth in claim 1, wherein said toggle assembly base portion is mounted to a surface of said operating member that opposes a contact surface of said cam.

9. The anti-overloading device as set forth in claim 1, wherein said device further includes a second cam for moving said operating member is the other of said two directions, and a second cam follower spaced apart from said cam follower, said second cam follower being mounted on said operating member such that it contacts a contact surface of said second cam.

10. The anti-overloading device as set forth in claim 5, wherein said first and second links are of equal length.

11. An improved overload protection device for use in a restraint camming apparatus in which a linear guide guides an associated operating member in reciprocating movement in first and second different and opposing directions and a restraint cam drives the operating member in its reciprocating movement and the restraint cam drives the operating member at least in the first of said two directions, the improvement, comprising;

a collapsible toggle assembly interposed between said restraint cam and said operating member, the toggle assembly including a body portion connected to said operating member, said toggle assembly having two free arms extending therefrom that are separated by a intervening space, a cam follower rotatably supported on a pin, two pairs of first and second support links, each of the first and second support links having two opposing ends, first ends of said first and second support links being rotatably connected to said toggle assembly body portion free arms, and the second ends of said first and second support links being aligned together and engaging said cam follower pin to thereby support said cam follower between said body portion free ends, said first and second support links supporting said cam follower in contact with said restraint cover in a first operative position until a preselected force is applied to said cam follower by said restraint cam, whereby said support links rotate inwardly of said toggle assembly body portion free arms and move said cam follower into said intervening space to thereby break contact of said cam follower with said restraint cam.

12. The overload protection device of claim 11, wherein said second support link second ends are positioned over said first support link second ends.

13. The overload protection device of claim 11, wherein said first support link second ends include holes formed therein that rotatably receive opposite ends of said cam follower pin, and said second support link first ends includes slots formed therein that overlie said first support link second end holes, said slots also receiving opposite ends of said cam follower pin therein, said cam follower pin being slidably received in said slot.

14. The overload protection device of claim 11, wherein said first and second links are of equal lengths.

15. The overload protection device of claim 11, wherein in said first operative position, said cam follower lies outside an imaginary line drawn through said first ends of said first and second support links, and wherein in said second operative position, said cam follower lies inside of said imaginary line.

16. An anti-overloading device for use with an associated camming apparatus for driving an operating member in reciprocating motion in two opposing directions, the apparatus further including a linear guide assembly that guides the associated operating member in the reciprocating movement, and a rotatable cam for driving said operating member in said reciprocating movement during rotation of said cam, and further including a cam follower rotatably mounted to said operating member and positioned thereon so as to provide contact between said cam and said operating member, the anti-overloading device comprising, in combination:

a collapsible toggle assembly for supporting the cam follower in contact between said cam and said operating member during operation of said restraint camming apparatus, the collapsible toggle assembly collapsing to break said contact between said cam and said cam follower to thereby stop motion by said operating member in one of said two direction, when said operating member encounters a resistance force exceeding a preselected magnitude during movement in said one direction;

said collapsible toggle assembly including a base portion mounted to said operating member, the base portion having two free ends extending away from said base portion toward said cam and separated by a base portion intervening space;

two linkages disposed on opposite sides of said base portion and rotatably connected to said toggle assembly free ends, said two linkages spanning said base portion intervening space on opposite sides of said base portion intervening space, said linkages further rotatably supporting said cam follower therebetween in a first operative position where said cam follower extends away from said toggle assembly base portion and into contact with said cam during said operating member reciprocating movement, said linkages further collapsing upon themselves and toward said toggle assembly base portion when said operating member encounters a resistance force exceeding a preselected magnitude in its movement in said one direction, thereby drawing said cam follower into a second operative position where it is removed said from contact with said cam.

* * * * *